US005247491A

United States Patent [19]

Kwiatkowski

[11] Patent Number: 5,247,491

[45] Date of Patent: Sep. 21, 1993

[54] DEVICE FOR PROJECTING A RAINBOW-LIKE SPECTRAL DISPLAY IN THE FORM OF A SYMBOL DESIGN, TIME INDICATING DISPLAY AND THE LIKE

[76] Inventor: Zdzislaw Kwiatkowski, 547 Morgan Ave., #4R, Brooklyn, N.Y. 11222

[21] Appl. No.: 922,138

[22] Filed: Jul. 30, 1992

Related U.S. Application Data

[63] Continuation-in-part of Ser. No. 737,318, Jul. 29, 1991, abandoned.

[51] Int. Cl.[5] .................... G04B 19/00; G04C 17/00; F21V 5/00; G02B 6/34

[52] U.S. Cl. .................................. 368/79; 368/239; 368/240; 359/615; 359/833; 362/327; 362/806

[58] Field of Search .................... 368/79, 82, 83, 223, 368/239, 240, 241; 40/423; 116/202, 206; 340/256; 359/615, 616, 831, 833, 837; 362/255, 253, 326, 327, 337, 339, 806–811

[56] References Cited

U.S. PATENT DOCUMENTS

| | | | |
|---|---|---|---|
| 3,636,915 | 1/1972 | Ruppert | 116/124 |
| 3,722,459 | 3/1973 | Kisselmann et al. | 116/129 R |
| 3,739,512 | 6/1973 | Ruppert | 40/130 K |
| 4,118,924 | 10/1978 | Foellner | 368/223 |
| 4,557,055 | 12/1985 | Arai | 353/81 |
| 4,681,402 | 7/1987 | Tiffany | 350/286 |
| 4,849,866 | 7/1989 | Mori | 362/327 |
| 4,955,975 | 9/1990 | Mori | 350/96.19 |
| 4,992,916 | 2/1991 | Henkes | 362/255 |
| 4,996,632 | 2/1991 | Aikens | 362/32 |
| 5,146,364 | 9/1992 | Oku | 359/615 |

*Primary Examiner*—Vit W. Miska
*Attorney, Agent, or Firm*—Goodman & Teitelbaum

[57] ABSTRACT

A device for projecting a rainbow-like spectral display including a housing provided with a projecting arrangement for projecting the rainbow-like spectral display onto a viewable surface. The projecting arrangement includes segments, each segment including a light emitting source for producing light rays, and a diffraction member such as a prism for effecting a spectral dispersion of the light rays for projecting same to produce the rainbow-like spectral display. Preferably, each segment also includes a convergent or convex lens disposed between the light emitting source and the diffraction member, and a reflector covering a rear portion of each light emitting source. The housing could be portable, battery operated, and in the form of a casing provided with a hinged cover. The segments have a particular design so that in one embodiment, the rainbow-like spectral display is in the form of a religious symbol, and in another embodiment, the rainbow-like spectral digital time display. In a further embodiment, the device is a clock or watch with the projecting arrangement including numerous units angularly disposed side-by-side in a circle, with each unit including three segments disposed end to end, so that energizing particular ones of the light emitting sources of selected units provides a second hand, a minute hand and an hour hand for a rainbow-like spectral time display.

20 Claims, 4 Drawing Sheets

DEVICE FOR PROJECTING A RAINBOW-LIKE SPECTRAL DISPLAY IN THE FORM OF A SYMBOL DESIGN, TIME INDICATING DISPLAY AND THE LIKE

CROSS-REFERENCE TO RELATED APPLCIATION

This is a continuation-in-part of application Ser. No. 07/737,318, filed Jul. 29, 1991, now abandoned, where only that portion thereof which is germane to Applicant's contribution to the invention is disclosed and claimed herein.

BACKGROUND OF THE INVENTION

The invention relates to display devices, and more particularly, to devices for projecting a rainbow-like spectral display in the form of a symbol, design, time indicating display and the like, including segments having a light emitting source for projecting light rays, and diffraction means such as a prism, diffracting plate and the like to effect a spectral dispersion or diffraction of the light rays for projecting same onto a surface to produce the rainbow-like spectral display.

There are available various conventional devices for forming a rainbow-like spectral image which do not provide the novel improvements of the invention herein discussed.

Furthermore, prisms are well known in the clock or watch art, such as disclosed in U.S. Pat. Nos. 3,768,887, 3,786,626, 3,838,565, 4,043,116 and 4,118,924. However, the prisms disclosed in these above patents are used to change the direction of the light rays for viewing the time through the prism, where none of these above patents disclose, utilize or teach the use of a prism or any diffracting means for projecting a rainbow-like spectral time display on a surface spaced from the clock or watch.

SUMMARY OF THE INVENTION

It is accordingly an object of the present invention to provide a device for projecting a rainbow-like spectral display in the form of a symbol, design, time indicating display and the like which avoids the shortcomings of the prior art devices.

Another object of the present invention is to provide a device including a light emitting source directed towards diffracting means, such as a prism, for projecting a rainbow-like spectral display onto a surface spaced from the device.

A further object of the present invention is to provide a device for projecting a rainbow-like spectral display as described above, wherein the device includes a projecting arrangement comprising numerous segments, each segment including a light emitting source and diffracting means, such as a prism, for projecting the rainbow-like spectral display in the form of a symbol, design, time indicating display and the like.

Yet another object of the present invention is to provide a device as indicated above, wherein the projecting arrangement includes units each comprising three of the above segments, the units being arranged in a circular form to project a second hand, a minute hand and an hour hand display onto the surface to function as a clock or watch.

Another object of the present invention is to provide a device as mentioned above, wherein the projecting arrangement includes segments combined in a particular manner for projecting a religious symbol on the surface.

Yet another object of the present invention is to provide a device for projecting a rainbow-like spectral display, which is simple and easy to use.

And yet another object of the present invention is to provide a device for projecting a rainbow-like spectral display, which is inexpensive to manufacture, has few parts, can readily be assembled, and is reasonably priced.

Briefly, in accordance with the present invention, there is provided a device for projecting a rainbow-like spectral display in the form of a symbol, design, time indicating display and the like, including a housing and a projecting arrangement mounted in a wall of the housing for projecting the rainbow-like spectral display onto a viewable surface spaced from the projecting arrangement. The projecting arrangement includes segments disposed in a particular arrangement relative to each other, each of the segments including a light emitting source for producing light rays, and diffraction means such as a prism, diffracting plate and the like for receiving the light rays and effecting a spectral dispersion or diffraction of the light rays for projecting same onto the viewable surface to produce the rainbow-like spectral display, and an electrical power supply for energizing the light emitting source of each of the segments.

Preferably, each segment also includes a convergent or convex lens disposed between the light emitting source and the prism for converging the light rays toward the prism, and further including a reflector for covering a rear portion of each light emitting source for reflecting the light rays in a forward direction toward the prism. The electrical power supply could be a battery so that the housing is portable. The housing could be in the form of a casing provided with a hinged cover so that the viewable surface is an inner surface of the cover.

In one embodiment, the segments have a particular design so that the rainbow-like spectral display is in the form of a religious symbol, and in another embodiment, the rainbow-like spectral display is in the form of a rainbow-like spectral digital time display. In a further embodiment, the device is a clock or watch with the projecting arrangement including numerous units angularly disposed side-by-side in a circle, with each unit including three segments disposed end to end, so that energizing particular ones of the light emitting sources of selected units provides a second hand, a minute hand and an hour hand for a rainbow-like spectral time display.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred emboidments in which.

In the various FIGURES of the drawings, like reference characters designate like parts.

DESCRIPTION OF THE PREFERRED EMBODIMENTS

Figure 1:
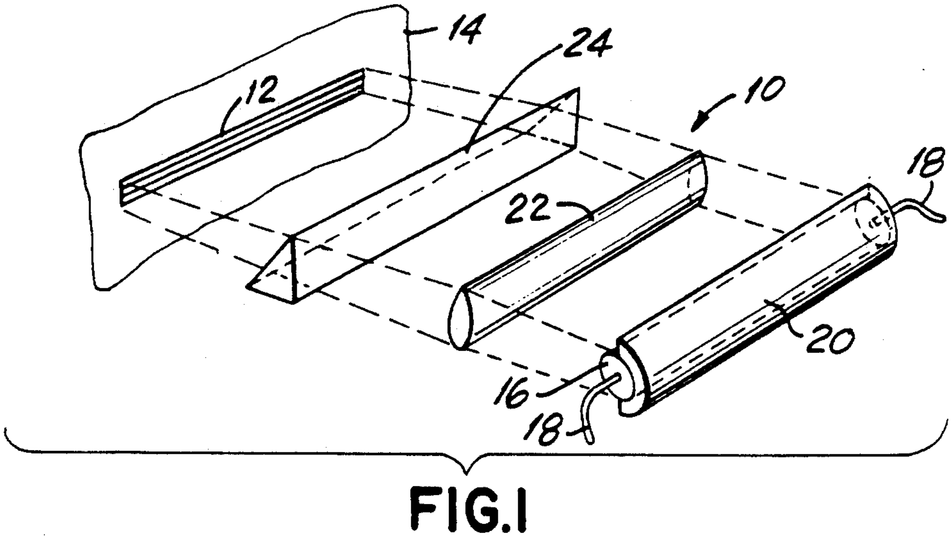
FIG. 1 is a diagrammatic exploded perspective view of a segment of a device for projecting a rainbow-like spectral display in accordance with the present invention.

Referring now to the drawings, FIG. 1 shows a segment 10 of a projecting arrangement which is mounted in a device for projecting a rainbow-like spectral display 12 onto a surface 14, preferably flat, which can be vertical as shown or horizontal or inclined, such as a wall, panel and the like, in accordance with the present invention. The segment 10, as well as the segments mentioned below, includes a light emitting source 16, such as a light blub, which is connected by electrical wires 18 to an electrical power supply in a manner well known in the art, preferably a reflector 20 covering a rear portion of the light emitting source 16 for reflecting the light rays in a forward direction therefrom, a convergent or convex lens 22 disposed in front of the light emitting source 16 for converging the light rays, and diffraction means such as a prism 24, a diffracting plate and the like disposed in front of the convergent or convex lens 22 to receive the converging light rays therefrom and to effect a spectral dispersion or diffraction of the light rays and project same onto the surface 14 to produce the rainbow-like spectral display 12.

Preferably, the above elements of the segment 10 are disposed in a sandwich-like arrangement so that the reflector 20 abuts against or is coated onto the light emitting source 16, the light emitting source 16 abuts against or is spaced a predetermined distance from the convex lens 22, and the convex lens 22 abuts against or is spaced a predetermined distance from the prism 24. The segment 10, particularly the prism 24, is spaced a predetermined distance from the surface 14 in order to produce desired type of rainbow-like spectral display 12. Accordingly, the projecting arrangement would include a desired number of segments 10 disposed in various shapes and arrangements to produce a particular type of rainbow-like spectral display, as will be explained below.

Figure 2:
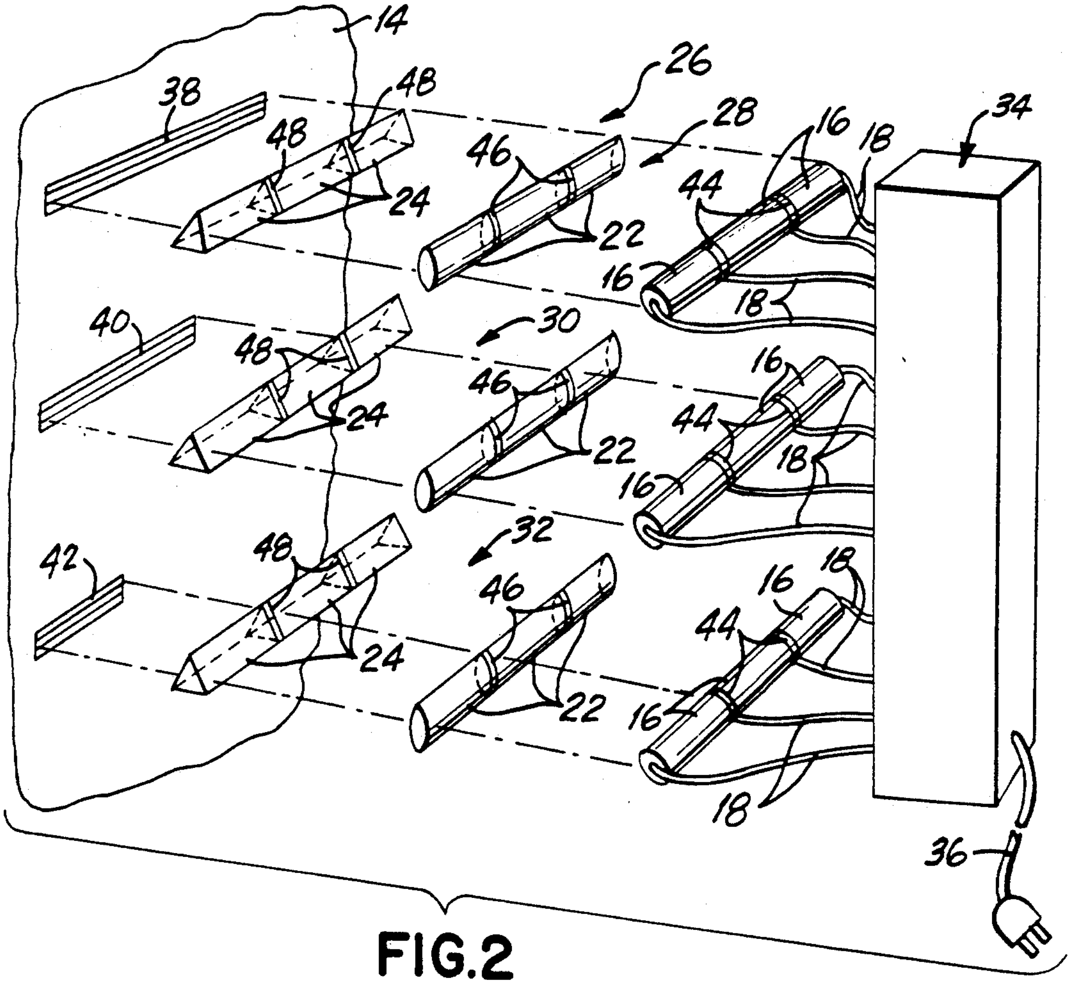
FIG. 2 is a diagrammatic exploded perspective view showing the segment of FIG. 1 combined and coacting with similar segments in a device to provide a varible rainbow-like spectral display.

FIG. 2 illustrates a projecting arrangement 26 for projecting a particular type of rainbow-like spectral display onto the surface 14. The projecting arrangement 26 includes an upper unit 28, an intermediate unit 30 and a lower unit 32. Each of the units 28, 30 and 32 have the same or similar construction, each including three segments 10 arranged end to end. The electrical wires 18 for each of the light emitting sources 16 are connected to an electronic control box 34 preferably having a printed circuit board with electronic computer chips (not shown) for determining the lighting sequence of the light emitting sources 16. The printed circuit board is connected to a conventional electric power cord 36 for plugging into an electrical power supply. If desired, manual control switches (not shown), such as an on/off switch, can be provided on the electronic control box.

As shown, all three light emitting sources 16 of unit 28 are energized to produce an elongated rainbow-like spectral display 38. Only two of the light emitting sources 16 of unit 30 are energized to produce a rainbow-like spectral display 40 which is approximately one third shorter than the rainbow-like spectral display 38. Only one light emitting source 16 of the unit 32 is energized to produce a rainbow-like spectral display 42 which is only about one third of the rainbow display 38 or approximately one half of the rainbow-like spectral display 40. Thus, depending upon the program circuitry in the electronic control box 34, the units 28, 30 and 32 can project a variable rainbow-like spectral display on the surface 14 by energizing one, two, three or none of some of the light emitting sources 16 of each unit.

It is noted, that in order to better direct the light rays through the units 28, 30 and 32 and to avoid misdirected light rays from emitting therefrom, opaque partitions are disposed between similar parts of the segments 10 of each unit 28, 30 and 32. Thus, opaque partitions 44 are disposed between the light emitting sources 16 of each unit, opaque partitions 46 are disposed between the convex lenses 22 of each unit and opaque partitions 48 are disposed between the prisms 24 of each unit.

It is noted, that the reflectors 20 are not shown in FIG. 2 for the sake of clarity, where obviously the reflector 20 for each unit 28, 30 and 32 could be an elongated one piece member or a coating film covering a rear portion of each of the light emitting sources 16 of the unit. It is noted, that the reflector for each unit could also be a part of the housing in which the unit is mounted. Furthermore, the ends of each unit should be covered by an opaque member or coating film to function in the same manner as the above mentioned opaque partitions, where such unit end covering could also be provided by the housing in which the units are mounted.

Figure 3:
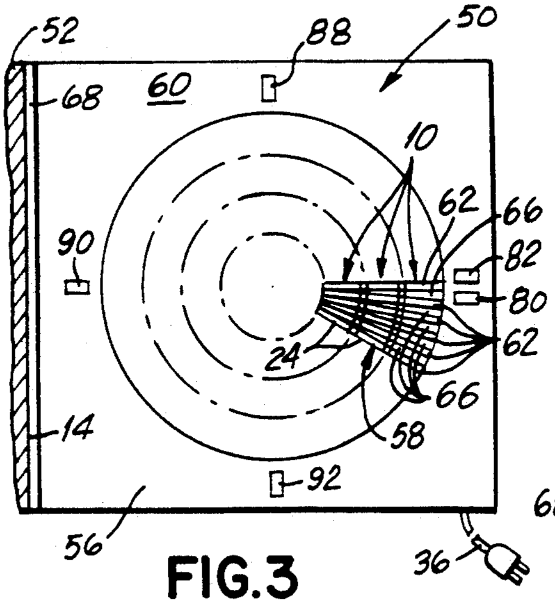
FIG. 3 is a fragmented top plan view of a clock provided with the elements of FIG. 2 for projecting a rainbow-like spectral time display onto a vertical surface.
Figure 5:
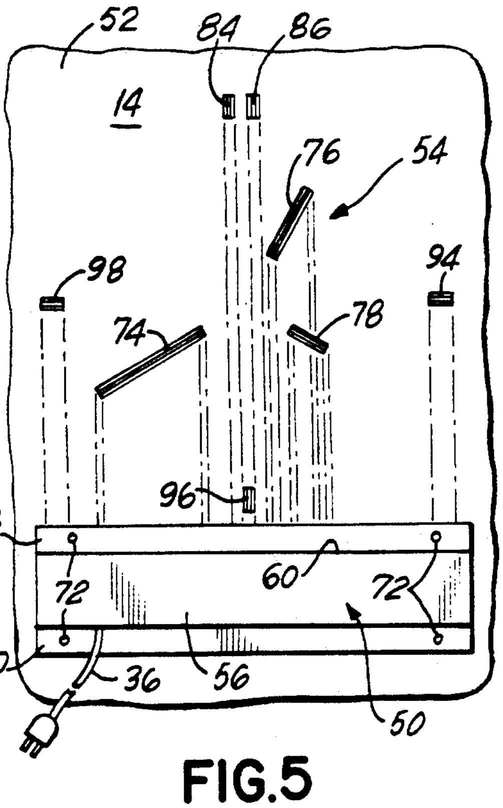
FIG. 5 is a fragmented elevational view showing the clock of FIG. 3 projecting the rainbow-like spectral time display onto the vertical surface.
Figure 4:
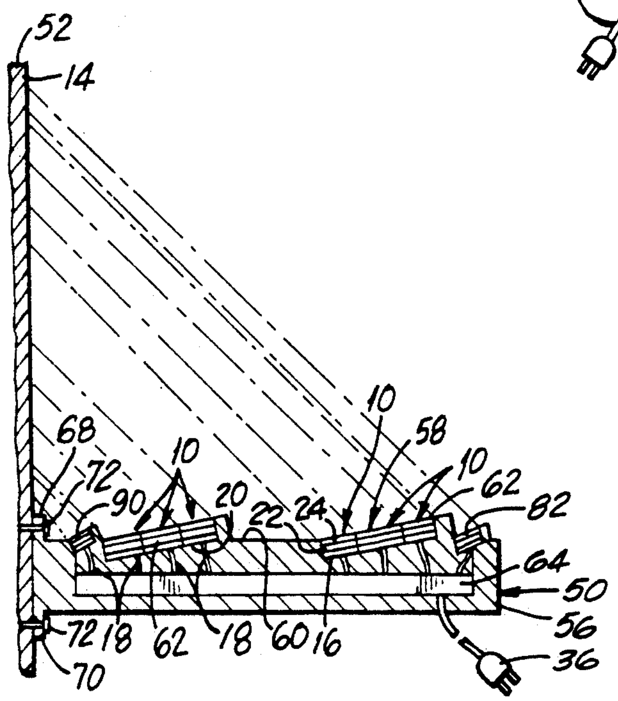
FIG. 4 is a fragmented cross sectional view of the clock of FIG. 3.

FIGS. 3, 4 and 5 show a clock 50 mounted on a wall 52 for projecting a rainbow-like spectral time display 54 onto the surface 14 of the wall 52 . The clock 50 includes a casing or housing 56 having a projecting arrangement 58 in the face 60 thereof. The projecting arrangement 58 includes numerous units 62, preferably sixty units angularly positioned in a circle in the face 60. The units 62 are identical to each other, each including three of the above mentioned segments 10 arranged end to end, with the electrical wires 18 thereof being connected to an electronic control box 64 disposed within the housing 56, with the electric power cord 36 extending outwardly from the housing 56. Preferably, each unit 62 is mounted in its own recess which provides the opaque partitions 66 between each unit 62 and also at the opposite ends of each unit 62, for the purposes mentioned above.

As shown in FIG. 4, the face 60 is perpendicular to the wall surface 14, and each unit 62 is disposed at an inclined angle towards the wall surface 14 for projecting the rainbow-like spectral 54 thereon. It is noted, that the inclined angle for each unit 62 is predetermined to provide a proper rainbow-like spectral time display 54, being determined by the optical requirements and by the mounting of the clock 50. Accordingly, the clock 50 is provided with an upper flange 68 and a lower flange 70 on the mounting side thereof, each of the flanges 68, 70 having holes therein to receive fastening means 72, such as nails, screws and the like, to secure the clock 50 to the wall 52.

The electronic control box 64 includes a predetermined program circuitry, obvious to those skilled in the art, to energize preselected light emitting sources 16 of the units 62 to designate the proper time. Accordingly, the energizing of all three light emitting sources 16 of one particular unit 62 would be utilized to display the second hand for the rainbow-like spectral time display 54. Also, the energizing of the inner two adjacent light emitting sources 16 of one particular unit 62 would be utilized to display the minute hand for the rainbow-like spectral time display 54. Likewise, the energizing of only one light emitting source 16, such as the inner most light emitting source 16, of one particular unit 62 would be utilized to display the hour hand for the rainbow-like spectral time display 54. FIG. 5 shows the second hand display 74, the minute hand display 76 and the hour hand display 78, all being in a rainbow-like spectral design.

Preferably, as shown in FIG. 3, the face 60 is provided with additional segments 80, 82, constructed in the same manner as the above segment 10, spaced outside the circular projecting arrangement 58 to provide a pair of rainbow-like spectral display markers 84, 86 on the surface 14 to indicate the twelve o'clock designation for the rainbow-like spectral time display 54, where it is understood that only one of the segments 80, 82 is necessary to provide only one of the rainbow-like spectral display markers 84, 86. Accordingly, though not necessary, it is preferred to have additional segments 88, 90, 92, also constructed in the same manner as the above segment 10, disposed 90 degrees apart around the circular projecting arrangement 58 to produce the rainbow-like spectral display markers 94, 96 and 98, respectively, to indicate the three o'clock, six o'clock and nine o'clock designations for the rainbow-like spectral time display 54. Thus, the hand markers 74, 76 and 78 in FIG. 5, with the aid of the markers 84, 86, 94, 96 and 98, would indicate the time is 4:05:40. Obviously, more segments can be added so that there is a rainbow-like spectral display marker to indicate each hour designation.

Figure 10:
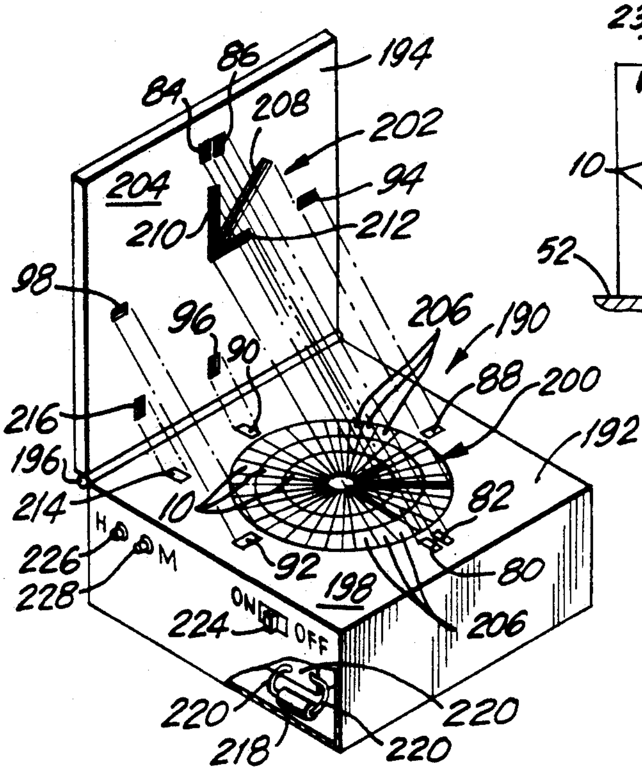
FIG. 10 is a perspective view of another clock or watch provided with the segments of FIG. 2 for projecting a rainbow-like spectral time display onto an inner surface of the cover thereof.
Figure 11:
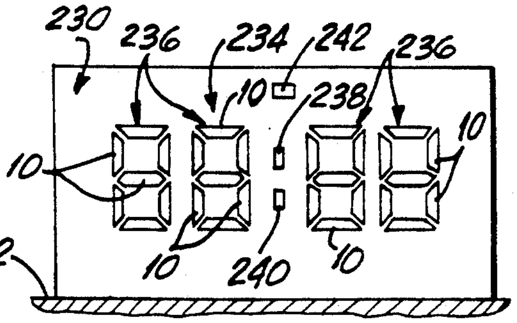
FIG. 11 is a plan view of the face of a digital clock or watch provided with the segments of FIG. 2 for projecting a rainbow-like spectral time display onto a surface.

Accordingly a further segment or segments in the form of a letter or letters (not shown) can be added to the face 60 to indicate A.M. and P.M. time, as shown in FIGS. 10 and 11, where this additional segment or segments would only be energized during the P.M. time. Furthermore, though not shown, it would be obvious to provide the housing 50 with manual control switches connected to the electronic control box such as an on/-off switch, time setting switches, and the like, see FIG. 10, which are well known in the art.

Figure 6:
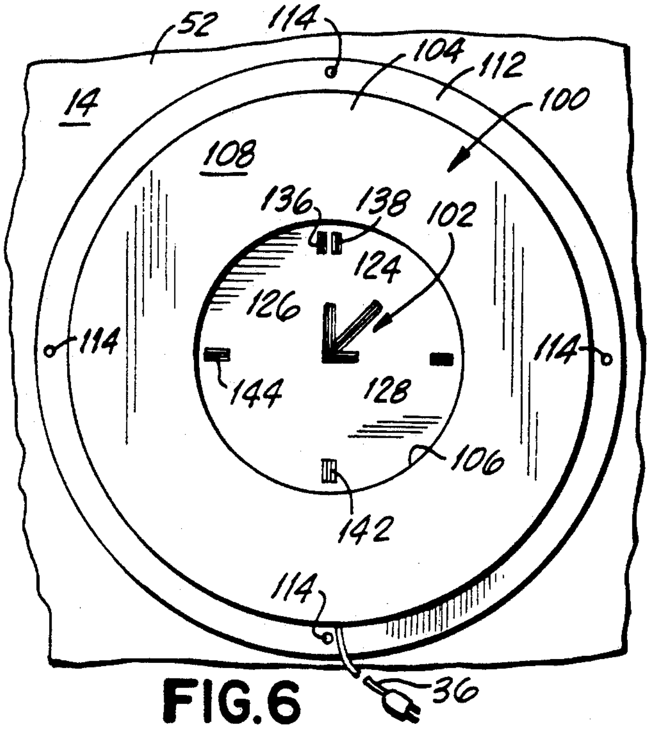
FIG. 6 is a fragmented elevational view showing a modified clock provided with the segments of FIG. 2 for projecting a rainbow-like spectral time display onto a vertical surface.
Figure 7:
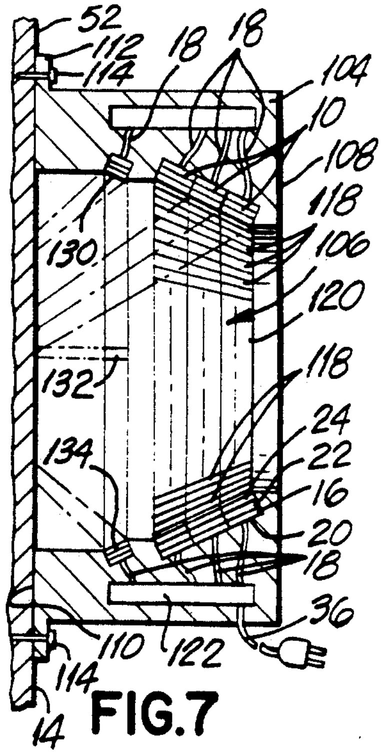
FIG. 7 is a fragmented cross sectional view of the modified clock of FIG. 6.

FIGS. 6 and 7 show a modified clock 100 mounted on the wall 52 for projecting a rainbow-like spectral time display 102 onto the surface 14 of the wall 52. The clock 100 includes a casing or housing 104 having a circular construction with a centrally located opening 106 extending therethrough from the outer wall 108 to the inner wall 110. If desired, the mouth of the opening 106 at the outer wall 108 could be covered with a transparent glass. A circular flange 112 is disposed around the side perimeter of the housing 104 adjacent to the inner wall 110. The flange 112 has spaced apart holes therein to receive fastening means 114, such as nails, screws and the like, to secure the clock 100 to the wall 52, where the inner wall 110 is positioned against the surface 14 of the wall 52, as best shown in FIG. 7.

The clock 100 includes a projecting arrangement 116 having numerous units 118, preferably sixty units, similar to the above units 62, angularly positioned in a circle and mounted in the interior wall 120 of the opening 106 of the housing 104, where the the interior wall 120 functions as the above face 60. The units 118 are identical to each other each including three segments 10 arranged end to end, with the electrical wires 18 thereof being connected to an electronic control box 122 disposed within the housing 104 in a circular , arrangement around the opening 106, with the electric power cord 36 extending outwardly from the housing 104. Preferably, each unit 118 is mounted in its own recess which provides the above-mentioned opaque partitions between each unit 118 and also at the opposite ends of each unit 118, for the purposes mentioned above.

As shown in FIG. 7, each unit 118 is disposed at a particular angle inclined inwardly towards the wall 52 for projecting the rainbow-like spectral time display 102 thereon. It is noted, that the inclined angle for each unit 118 is predetermined to provide a proper rainbow-like spectral time display 102, being determined by the optical requirements and the mounting of the clock 100, in such a manner that the outermost segments 10 of each unit 108 is directed towards the center of the hole 120 at the surface 14 of the wall 52, as discussed below.

Here again, the electronic control box 122 includes a predetermined program circuitry, obvious to those skilled in the art, to energize preselected light emitting sources 16 of the units 118 to designate the proper time. Accordingly, as discussed above, the energizing of all three light emitting sources 16 of one particular unit 118 would be utilized to display the second hand for the rainbow-like spectral time display 102. Also, the energizing of the outer two adjacent light emitting sources 16 of one particular unit 118 would be utilized to display the minute hand for the rainbow-like spectral time display 102. Likewise, the energizing of only one light emitting source 16, such as the outermost light emitting source 16, of one particular unit 118 would be utilized to display the hour hand for the rainbow-like spectral time display 102.

As shown in FIG. 6, the rainbow-like spectral time display 102 would be viewed by looking through the opening 106 in the housing 104 of the clock 100, where obviously the clock 100 could be mounted vertically as shown or horizontaly. FIG. 6 shows the second hand display 124 produced by energizing three light emitting sources 16 of a first unit 118, the hand display 126 produced by energizing two adjacent light emitting sources 16 of a second unit 118, and the hour hand display 128 produced by energizing one light emitting sources 16 of a third unit 118, all being in a rainbow-like spectral design. It is noted, that because of the angular positioning of the units 118 as mentioned above, the second hand display 124, the minute hand display 126 and the hour hand display 128 preferably all meet and overlap each other at the center of the rainbow-like spectral time display 102.

In the manner mentioned above, additional segments 130, 132, 134 and others not shown, all constructed in the same manner as segment 10, are mounted in a spaced apart arrangement in the inner wall 120 of the opening 106 between the circular projecting arrangement 116 and the inner wall 110 of the housing 104. A pair of the segments 130 provide the pair of rainbow-like spectral display markers 136, 138 on the surface 14 to indicate the twelve o'clock designation. Accordingly, the rainbow-like spectral display marker 140 is produced by the segment 132, the rainbow-like spectral display marker 142 is produced by the segment 134, and the rainbow-like spectral display marker 144 is produced by a segment not shown in FIG. 7. The markers 140, 142, 144 are disposed 90 degrees apart to indicate the three o'clock, six o'clock and nine o'clock designations, respectively, for the rainbow-like spectral time display 102. Thus, the rainbow-like spectral time display 102 in FIG. 6 would indicate the time is 3:00:07. As mentioned above, a further segment or segments (not shown) can be added to indicate A.M. and P.M. time, see FIGS. 10 and 11.

Figure 8:
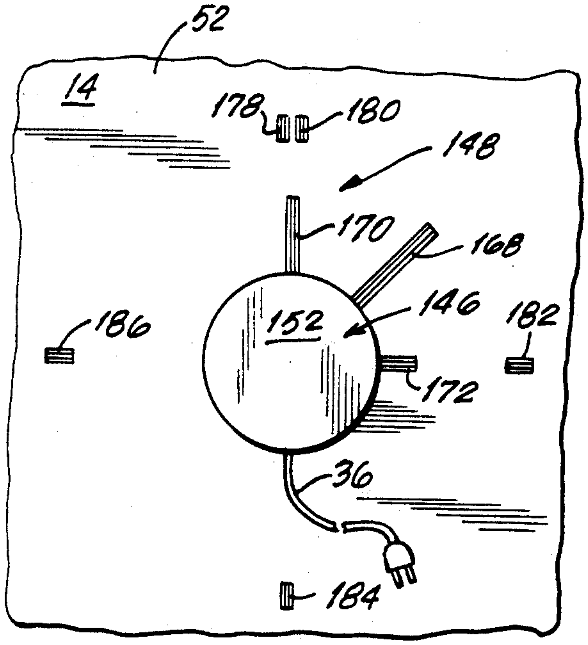
FIG. 8 is a fragmented elevational view showing a further modified clock provided with the segments of FIG. 2 for projecting a rainbow-like spectral time display onto a vertical surface.
Figure 9:
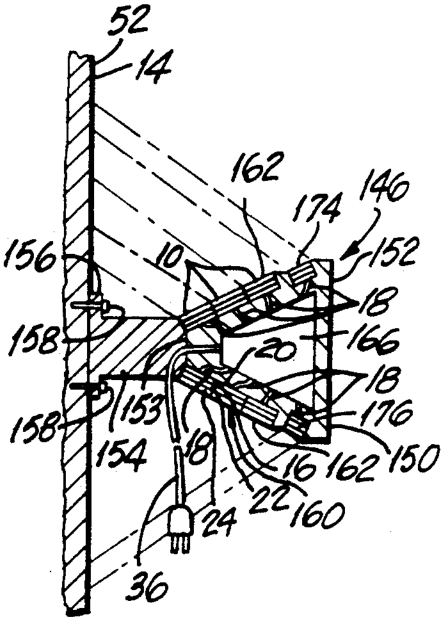
FIG. 9 is a fragmented cross sectional view of the modified clock of FIG. 8.

FIGS. 8 and 9 show a further modified clock 146 mounted on the wall 52 for projecting a rainbow-like spectral time display 148 onto the surface 14 of the wall 52. The clock 146 includes a casing or housing 150 having a frustum construction with the outer wall 152 having a larger diameter than the inner wall 153 thereof. The inner wall 153 of the housing 150 is securely mounted in a fixed position on a pedestal 154 having a circular flange 156 disposed around the perimeter of the base thereof. The flange 156 has spaced apart holes therein to receive fastening means 158, such as nails, screws and the like, to secure the clock 146 to the wall 52, where the base of the pedestal 154 is positioned against the surface 14 of the wall 52, as best shown in FIG. 9.

In a similar manner as mentioned above, the clock 146 includes a projecting arrangement 160 having numerous units 162, preferably sixty units, similar to the above units 62 and 118, angularly positioned in a circle and mounted in the exterior side wall 164 of the housing 150 where the exterior side wall 164 functions as the above face 60. The units 162 are similar to the above mentioned units, being identical to each other and each including three segments 10 arranged end to end, with the electric wires 18 thereof being connected to an electronic control box 166 disposed within the housing 150, with the electric power cord 36 extending outwardly from the pedestal 154. Preferably, as mentioned above, each unit 162 is mounted in its own recess which provides the above mentioned opaque partitions between each unit 162 and also at the opposite ends of each unit 162, for the purposes mentioned above.

As shown in FIG. 9, each unit 162 is disposed at a particular angle inclined outwardly towards the wall 52 for projecting the rainbow-like spectral time display 148 thereon. Here again, the inclined angle for each unit 162 is predetermined to provide a proper rainbow-like spectral time display 148, being determined by the optical requirements and the mounting of the clock 146 on the pedestal 154, in such a manner that the display produced by the inner most segments 10 of each unit 162 clears the outer wall 152 of the lock 146 when viewing the rainbow-like spectral time display 148 perpendicularly to the surface 14 of the wall 52, as shown in FIG. 8. Obviously, the clock 146 could be mounted vertically as shown or horizontally or inclined depending upon the position of the wall 52.

Once again, the electronic control box 166 includes a predetermined program circuitry in a manner discussed above to designate the proper time. Accordingly, as also discussed above, the energizing of all three light emitting sources 16 of one particular unit 162 would be utilized to display the second hand for the rainbow-like spectral time display 148, such as the second hand display 168 shown in FIG. 8. Also, the energizing of the inner two adjacent light emitting sources 16 of one particular unit 162 would be utilized to display the minute hand for the rainbow-like spectral time display 148, such as the minute hand display 170 shown in FIG. 8. Likewise, the energizing of only one light emitting source 16, such as the inner most light emitting source 16, of one particular unit 162 would be utilized t display the hour hand for the rainbow-like spectral time display 148, such as the hour hand display 172 in FIG. 8.

In the same manner mentioned above, additional segments 174, 176 and others not shown, all constructed in the same manner as segment 10, are mounted in a spaced apart arrangement in the exterior wall 164 above the circular projecting arrangement 160. A pair of the segments 174 provide a pair of rainbow-like spectral display markers 178, 180 to indicate the twelve o'clock designation. Accordingly, the rainbow-like spectral display marker 182 is produced by a segment not shown, the rainbow-like spectral display marker 184 is produced by the segment 176, and the rainbow display marker 186 is produced by another segment not shown. The markers 182, 184, 186 are disposed 90 degrees apart to indicate the three o'clock, six o'clock and nine o'clock designations, respectively, for the rainbow-like spectral time display 148. Thus, the rainbow-like spectral time display 148 in FIG. 8 would indicate the time is 3:00:07. Furthermore, as mentioned above, a further segment or segments (not shown) can be used to indicate A.M. and P.M. time, see FIGS. 10 and 11.

FIG. 10 shows a further modified clock 190 of the portable type, which as obvious to one skilled in the art, could be made smaller to function as a watch, either a pocket watch or a wrist watch, where a watch band could easily be attached thereto. The clock or watch 190 includes a casing or housing 192 having a box-like construction with a cover 194 pivotally secured thereto by a hinge 196. If desired, a commercially available hinge having stop means could be used to maintain the cover 194 in a perpendicular or inclined position relative to the face 198 of the housing 190.

The clock 190 projecting arrangement 200 mounted in the face 198 of the housing 192 for projecting a rainbow-like spectral time display 202 onto the inner surface 204 of the cover 194. The projecting arrangement 200 is similar to the above mentioned projecting arrangement 58 so that a detailed discussion thereof is not thought necessary. However, each of the units 206, constructed in the same or similar manner as the units 62, is disposed at a particular angle so that the second hand display 208, the minute hand display 210 and the hour hand display 212 of the rainbow-like spectral time display 202, preferably all meet and overlap each other at the center of the rainbow-like spectral time display 202, being similar to the above mentioned rainbow time display 102.

Furthermore, the inner most segments 10 of each unit 206 of the projecting arrangement 200 are preferably made longer than the other two outer segment 10 of each unit in order to elongate each hand display 208, 210, 212. Obviously, in accordance with the present invention, any one, two or all of the segments 10 could be elongated as desired.

Here again, the additional segments 80, 82 are mounted in a spaced apart arrangement in the face 198 outside the circular projecting arrangement 200 to provide the pair of rainbow-like spectral display markers 84, 86, respectively, to indicate the twelve o'clock designation. As indicated above, the rainbow-like spectral display marker 94 is produced by the segment 88, the rainbow-like spectral display marker 96 is produced by the segment 90 and the rainbow-like spectral display marker 98 is produced by the segment 92, the markers 94, 96, 98 being disposed 90 degrees apart to indicate the three o'clock, six o'clock and nine o'clock designations for the rainbow-like spectral time display 202.

Furthermore, as indicated above, a further segment 214, constructed in the same manner as segment 10, is mounted in the face 198 to produce a rainbow-like spectral display marker 216. The light emitting source 16 of the segment 214 is only energized during the P.M. hours so that the rainbow-like spectral display marker 216 indicates P.M. time. Thus, the rainbow-like spectral time display 202 in FIG. 10 would indicate the time is 3:00:07 P.M.

As indicated in FIG. 10, a suitable conventional replaceable battery 218, to provide an electrical power supply, is connected by electrical wires 220 to the predetermined program circuitry within the electronic control box 222. An on/off switch 224, an hour setting button 226 and a minute setting button 228, all well known in the art, are also connected in a conventional manner to the predetermined program circuitry within the electronic control box 222. Obviously, other features normally provided in clocks and watches can also be added by one skilled in the art to the clock or watch 190.

FIG. 11 shows a further modified clock or watch 230 of the digital type having a casing or housing 232 disposed perpendicularly against the wall 52 for projecting a rainbow-like spectral digital time display thereon. Obviously, the clock or watch 230 could be provided with the above electric power cord 36 or the battery 218 to be a portable type, could be provided with a cover similar to the clock or watch 190 of FIG. 10, and could also could be provided with a watch band if desired.

The clock or watch 230 includes a projecting arrangement 234 having four sets 236 of segments 10, with each set 236 having the segments 10 arranged to form the numeral eight so that by energizing the light emitting sources 16 of selected ones of the segments 10, all the numerals zero to nine can be formed thereby. Additional segments 238, 240, constructed in the same or similar manner as the segment 10, are centrally located between the sets 236 to separate the hour designation from the minute designation. A further segment 242 is provided, the light emitting source 16 thereof being only energized during the P.M. hours, so that the segment 242 produces a rainbow-like spectral display marker to indicate P.M. time. The segment 242 is the same as the above segment 214 of the clock or watch 190.

Figure 12:
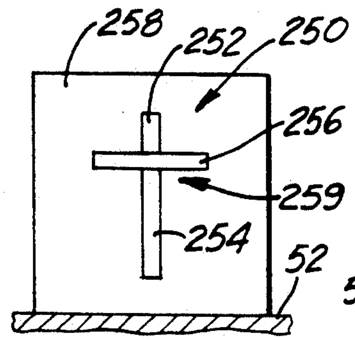
FIG. 12 is a plan view of the face of a device provided with the segments of FIG. 2 for projecting a rainbow-like spectral display onto a surface, the display being a religious symbol in the form of a cross for the Christian religion.
Figure 13:
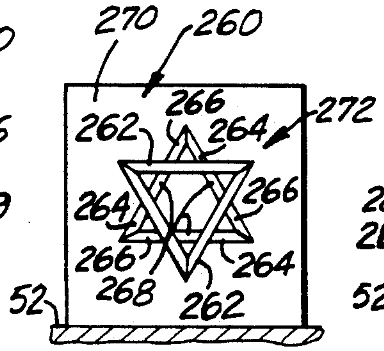
FIG. 13 is a plan view of the face of a device provided with the segments of FIG. 2 for projecting a rainbow-like spectral display onto a surface, the display being a religous symbol in the form of a star of David for the Jewish religion.
Figure 14:
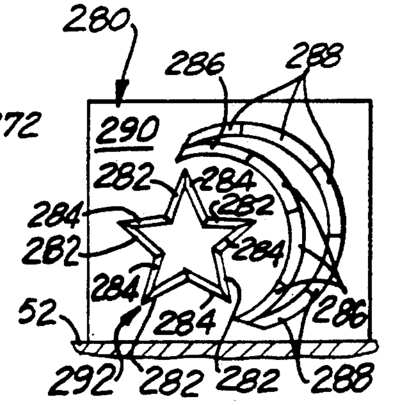
FIG. 14 is a plan view of the face of a device provided with the segments of FIG. 2 for projecting a rainbow-like spectral display onto a surface, the display being a religious symbol in the form of a star and crescent moon for the Mohammud religion.

As would be obvious to one skilled in the art, the above mentioned segments 10 can be made in any suitable length, size or shape, such as being angularly shaped, and mounted at an inclined angle in a face of a device for a particular symbol or design for projecting the symbol particular design in the form of a rainbow-like spectral display onto a surface disposed perpendicularly or inclined to the face of the device. FIGS. 12, 13 and 14 show examples of such devices where the rainbow-like spectral display is in the form of a religious symbol.

FIG. 12 shows a device 250 having three segments, a small segment 252, a larger segment 254 and a transverse segment 256, all constructed in the same or similar manner as the above mentioned segment 10, each mounted in an inclined position in the face 258 of the device 250 to form a projecting arrangement 259 having the design of a cross for the Christian religion. The segments 252, 254, 256 are angled in a direction towards the wall 52 for projecting the rainbow-like spectral cross thereon. Obviously, other types of crosses can also be formed.

FIG. 13 shows a device 260 having three similar segments 262, three similar segments 264, three similar segments 266 and three similar segments 268, all constructed in the same manner or similar as the above mentioned segment 10, and mounted in an inclined position in the face 270 to form a projecting arrangement 272 having the design of a star of David for the Jewish religion. All of the segments of the projecting arrangement 272 are angled in a predetermined direction towards the wall 52 for projecting the rainbow-like spectral star display thereon.

FIG. 14 shows a device 280 having five similar segments 282, five similar segments 284, four similar curved segments 286 and five similar curved segments 288, all constructed in the same or similar manner as the above mentioned segment 10, and mounted in an inclined position in the face 290 of the device 260 to form a first projecting arrangement 292 having the design of a star formed by the segments 282, 284, and a second projecting arrangement 294 having the design of a crescent moon formed by the curved segments 286, 288 so that the projecting arrangements 292, 294 together form the star and crescent moon for the Mohammud religion. All of the segments of the first and second projecting arrangements 292, 294 are angled in a predetermined direction towards the wall 52 for projecting the rainbow-like spectral star and crescent moon display thereon. Obviously, the number of segments used to form the star and crescent moon can be varied as desired.

Each of the faces 252, 270, 290 of the devices 250, 260, 280, respectively, are positoned perpendicularly to the wall 52. However, it is understood, that each of the devices 250, 260, 280 could be provided with the above electric power cord 36 or the battery 218 to be a portable type, and could be provided with a cover similar to the clock or watch 190 of FIG. 10, and could also be provided with a watch or wrist band, or the like if desired. Furthermore, the religious symbols shown in FIGS. 12, 13 and 14 could be combined with and form a part of the above clocks and watches.

Numerous alterations of the structures herein discussed will suggest themselves to those skilled in the art. However, it is to be understood that the present disclosure relates to preferred embodiments of the invention which are for purposes for illustration only, and are not to be construed as a limitation of the invention.

What is claimed is:

1. A device comprising:

a housing;

projecting arrangement means mounted in a wall of said housing for projecting a rainbow-like spectral display onto a viewable surface spaced from said projecting arrangement means;

said projecting arrangement means including segments disposed in a particular arrangement relative to each other;

each of said segments including light emitting means for producing light rays, and diffraction means for receiving the light rays and effecting a spectral dispersion of the light rays for projecting same onto the viewable surface to produce the rainbow-like spectral display; and electrical power supply means for energizing said light emitting means of each of said segments.

2. A device according to claim 1, wherein each of said segments also includes a convergent disposed between said light emitting means and said diffraction means converging the light rays from said light emitting means toward said diffraction means.

3. A device according to claim 1, wherein reflector means cover a rear portion of said light emitting means of each of said segments for reflecting the light rays in a forward direction toward its associated diffraction means.

4. A device according to claim 1, wherein each of said segments is disposed at a particular inclined angle directed; relatively toward the viewable surface.

5. A device according to claim 1, wherein said housing includes means for securing said housing to the viewable surface so that said wall of said housing is disposed at an angle to the viewable surface.

6. A device according to claim 1, wherein said electrical power supply means includes a battery so that said housing is portable.

7. A device according to claim 1, wherein the viewable surface is an inner surface of a cover hinged to said wall of said housing.

8. A device according to claim 1, wherein said particular arrangement of said segments has a particular construction so that the rainbow-like spectral display is in the form of a religious symbol.

9. A device according to claim 1, wherein said particular arrangement of said segments includes sets of said segments, each of said sets having said segments thereof arranged to form a numeral eight so that when energizing said light emitting means of selected ones of said segments of each of said sets, predetermined ones of numerals zero to nine are formed to project a rainbow-like spectral digital time display onto the viewable surface.

10. A device according to claim 9, wherein said wall of said housing includes an additional segment, said light emitting means of said additional segment being energized during P.M. hours to project a rainbow-like spectral display marker on the viewable surface to indicate P.M. time for the rainbow-like spectral digital time display.

11. A device according to claim 1, wherein said device is a clock, watch and the like, said projecting arrangement means including numerous units angularly disposed side-by-side in a circle, each of said units including three of said segments disposed end to end so that energizing all three light emitting means of a selected first unit is utilized to display a second hand for a rainbow-like spectral time display, energizing two adjacent light emitting means of a selected second unit is utilized to display a minute hand for the rainbow-like spectral time display, and energizing only one light emitting source of a selected third unit is utilized to display an hour hand for the rainbow-like spectral time display.

12. A device according to claim 11, wherein each of said segments of each of said units includes a convergent lens disposed between an associate one of said light emitting means and an associated one of said diffraction means converging the light rays from said associated light emitting means toward said associated diffraction means.

13. A device according to claim 11, wherein reflector means cover a rear portion of said light emitting means of each of said segments of each of said units for reflecting the light rays in a forward direction toward its associated diffraction means.

14. A device according to claim 11, wherein opaque partitions are disposed between said segments of each unit, and also between each of said units.

15. A device according to claim 11, wherein said wall of said housing includes at least one additional segment, said light emitting means of said additional segment being energized to project a rainbow-like spectral display marker on the viewable surface to indicate at least a twelve o'clock designation for the rainbow-like spectral time display.

16. A device according to claim 11, wherein said wall of said housing includes an additional segment, said light emitting means of said additional segment being energized during P.M. hours to project a rainbow-like spectral display marker on the viewable surface to indicate P.M. time for the rainbow-like spectral time display.

17. A device according to claim 11, wherein said wall of said housing is a face of said device, said face being disposed perpendicular to the viewable surface, and each of said units being disposed at a particular inclined angle in said face directed relatively toward the viewable surface.

18. A device according to claim 11, wherein said housing has a circular construction with a centrally located opening extending therethrough, said wall of said housing being an interior wall of said opening, said interior wall being disposed substantially perpendicular to the viewable surface which is viewed through said opening, and each of said units being disposed in a particular inclined angle in said interior wall directed relatively toward the viewable surface.

19. A device according to claim 11, wherein said housing has a frustum construction including an outer surface and an inner surface, said wall of said housing being an exterior side wall of said housing disposed between said outer and inner surfaces, said outer surface being disposed parallel to the viewable surface, and each of said units being disposed in a particular inclined angle in said exterior side wall directed relatively toward the viewable surface.

20. A device according to claim 11, wherein said housing is a casing provided with a hinged cover the viewable surface being an inner surface of said cover, said wall of said housing being a face of said casing, said inner surface of said cover being disposed perpendicular to said face when said device is in operation, and each of said units being disposed at a particular inclined angle in said face to be directed relatively toward said inner surface of said cover when disposed perpendicular to said face.

* * * * *